(12) United States Patent
Moriya et al.

(10) Patent No.: US 11,535,118 B2
(45) Date of Patent: Dec. 27, 2022

(54) VEHICLE

(71) Applicant: SUBARU CORPORATION, Tokyo (JP)

(72) Inventors: Fumiyuki Moriya, Tokyo (JP); Kazuya Fuke, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 168 days.

(21) Appl. No.: 16/717,572

(22) Filed: Dec. 17, 2019

(65) Prior Publication Data

US 2020/0307412 A1 Oct. 1, 2020

(30) Foreign Application Priority Data

Mar. 27, 2019 (JP) .............................. JP2019-059629

(51) Int. Cl.
| | |
|---|---|
| *H02J 7/00* | (2006.01) |
| *B60L 58/12* | (2019.01) |
| *B60L 50/60* | (2019.01) |
| *H02J 13/00* | (2006.01) |
| *B60L 53/62* | (2019.01) |
| *B60L 50/53* | (2019.01) |

(52) U.S. Cl.
CPC .............. *B60L 58/12* (2019.02); *B60L 50/53* (2019.02); *B60L 50/60* (2019.02); *B60L 53/62* (2019.02); *H02J 7/007186* (2020.01); *H02J 13/00036* (2020.01)

(58) Field of Classification Search
USPC .................................................. 320/109, 128
See application file for complete search history.

(56) References Cited

U.S. PATENT DOCUMENTS

| | | | | |
|---|---|---|---|---|
| 8,655,535 | B2* | 2/2014 | Oh | B60L 3/04 |
| | | | | 701/22 |
| 9,048,050 | B2* | 6/2015 | Kurita | H01H 47/02 |
| 2012/0283902 | A1* | 11/2012 | Kusumi | B60L 53/14 |
| | | | | 701/22 |
| 2014/0159478 | A1* | 6/2014 | Ang | B60L 1/003 |
| | | | | 307/9.1 |
| 2015/0231976 | A1* | 8/2015 | Byun | H02H 9/001 |
| | | | | 320/109 |
| 2018/0134163 | A1* | 5/2018 | Kuribara | B60L 53/38 |
| 2018/0278072 | A1* | 9/2018 | Lee | G01R 31/3842 |

FOREIGN PATENT DOCUMENTS

JP 2017-153220 A 8/2017

* cited by examiner

*Primary Examiner* — Samuel Berhanu
(74) *Attorney, Agent, or Firm* — McGinn I.P. Law Group, PLLC.

(57) ABSTRACT

A vehicle includes a battery, an electric power acquirer, a relay, a pre-charge relay, a power supply unit, and a controller. The controller performs a control of electric power transmission through a power line of the vehicle. The controller executes pre-charge processing on a request for operation of the power supply unit, with the relay being in a disconnected state, and with the electric power acquirer being available for electric power acquisition. The pre-charge processing includes raising a voltage of the power line by switching the pre-charge relay. The controller causes a transition of a mode of the electric power transmission to a direct transmission mode. The direct transmission mode includes transmitting electric power acquired by the electric power acquirer to the power supply unit.

11 Claims, 4 Drawing Sheets

VEHICLE

CROSS-REFERENCE TO RELATED APPLICATIONS

This application claims priority from Japanese Patent Application No. 2019-059629 filed on Mar. 27, 2019, the entire contents of which are hereby incorporated by reference.

BACKGROUND

The technology relates to a vehicle including a battery and an electric power acquirer that acquires electric power for battery charging from outside the vehicle.

Vehicles such as electric vehicles (EV) and plug-in hybrid electric vehicles (PHEV) include a battery and an electric power acquirer. The battery accumulates electric power for travel of a vehicle. The electric power acquirer is able to acquire charging electric power for the battery from outside. In such vehicles, utilities have been recently put into practical use. The utilities supply a power supply voltage to various electric devices with utilization of electric power of the battery. The utilities make it possible, for example, to drive an electric air conditioner of a vehicle, or to supply an AC power supply voltage from a power receptacle attached inside a vehicle cabin. The supply of the AC power supply voltage makes it possible to use, for example, a home electric appliance inside the vehicle cabin.

As to the related techniques, reference can be made to Japanese Unexamined Patent Application Publication (JP-A) No. 2017-153220. JP-A No. 2017-153220 describes a vehicle that is able to charge a battery and to drive an electric air conditioner with the use of an external power supply. In the vehicle, after the charging of the battery, the electric air conditioner is driven with the use of the external power supply, with a system main relay kept in a disconnected state. The system main relay may couple the battery to a power line of the vehicle. Thus, the vehicle avoids electric power from being taken out from the battery to the electric air conditioner, making it possible to start the vehicle, with the battery kept in full charge.

SUMMARY

An aspect of the technology provides a vehicle including a battery, an electric power acquirer, a relay, a pre-charge relay, a power supply unit, and a controller. The battery is configured to accumulate electric power for travel of the vehicle. The electric power acquirer is able to acquire charging electric power for the battery, from outside the vehicle. The relay is configured to switch coupling between the battery and a power line of the vehicle. The pre-charge relay is able to couple the battery and the power line through a pre-charge device. The power supply unit is able to receive electric power from the power line and supply a power supply voltage to a device other than a traveling motor. The controller is configured to perform a control of electric power transmission through the power line. The controller is configured to execute pre-charge processing on a request for operation of the power supply unit, with the relay being in a disconnected state, and with the electric power acquirer being available for electric power acquisition. The pre-charge processing includes raising a voltage of the power line by switching the pre-charge relay. The controller is configured to cause a transition of a mode of the electric power transmission to a direct transmission mode. The direct transmission mode includes transmitting electric power acquired by the electric power acquirer to the power supply unit.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
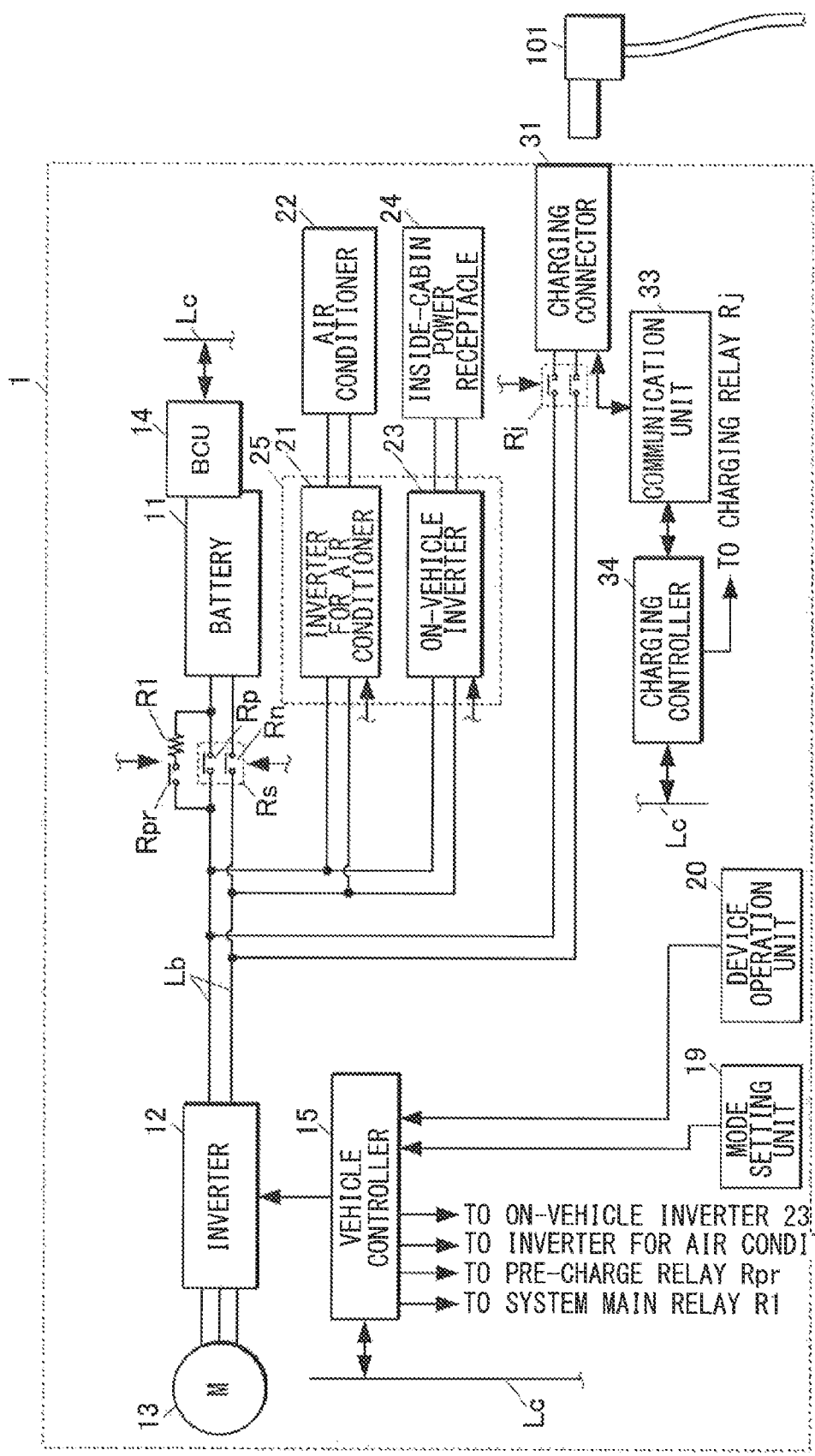
FIG. 1 is a block diagram illustrating a vehicle according to a first embodiment of the technology.

Some vehicles include a charging system that charges a battery using an external power supply. Such a charging system generally stops acquisition of charging electric power from the external power supply when the battery becomes fully charged. In vehicles including utilities, the use of the utilities is expected before and after the charging of the battery, or during the charging of the battery. With such expectation, when the battery becomes fully charged, the supply of the charging electric power from the external power supply is stopped. Thereafter, the utilities consume electric power of the battery, causing a decrease in a state of charge (SOC) of the battery. In a case where the SOC of the battery becomes equal to or lower than a predetermined value, the acquisition of electric power from the external power supply is restarted, causing the charging of the battery to full charge. This results in repetition of the discharging and the charging of the battery as described above. In such a control method, the SOC of the battery varies significantly, contributing to early deterioration in the battery.

It is desirable to provide a vehicle that makes it possible to suppress repetition of significant discharging and charging of a battery, while coping with a request for operation of an electric device after the charging of the battery.

In the following, some preferred but non-limiting embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

First Embodiment

FIG. 1 is a block diagram illustrating a vehicle according to a first embodiment of the technology. A vehicle 1 according to the first embodiment of the technology may be, for example, an automobile such as an EV and a PHEV. The vehicle 1 may include a battery 11, a traveling motor 13, an inverter 12, and a battery control unit (BCU) 14. The battery 11 may accumulate electric power for travel of the vehicle 1. The traveling motor 13 may drive a driving wheel. The inverter 12 may convert electric power between the battery 11 and the traveling motor 13. The BCU 14 may manage a state of the battery 11. The battery 11 may output a high voltage that drives the traveling motor 13 and may be referred to as a high-voltage battery. The battery 11 may include, for example, a secondary battery such as a lithium-ion storage battery or a nickel hydrogen storage battery.

The vehicle 1 may further include a system main relay Rs, a pre-charge relay Rpr, and a pre-charge device R1. The system main relay Rs may include a positive-electrode-side relay Rp and a negative-electrode-side relay Rn. The battery 11 may be coupled to a power line Lb through the system main relay Rs. In a case with the system main relay Rs in a disconnected state, the battery 11 and the power line Lb may be electrically disconnected in order to hinder a current flow therebetween. In a case with the system main relay Rs in a connected state, the battery 11 and the power line Lb may be electrically coupled in order to cause a current flow therebetween. The system main relay Rs being in the "connected state" means that both the positive-electrode-side relay Rp and the negative-electrode-side relay Rn are turned on. The system main relay Rs being in the "disconnected state" means that the positive-electrode-side relay Rp or the negative-electrode-side relay Rn, or both, are turned off.

In one embodiment of the technology, the system main relay Rs may serve as a "relay".

In a case with a great voltage difference between the power line Lb and the battery 11, the pre-charge relay Rpr and the pre-charge device R1 may perform pre-charging of the power line Lb or input capacitance of a device coupled to the power line Lb, causing a mild rise in a voltage of the power line Lb. The rise in the voltage of the power line Lb means raising a voltage between a pair of the power lines Lb. This makes it possible to mildly eliminate the voltage difference between the power line Lb and the battery 11. The pre-charge device R1 may include, for example, a resistor. Turning on the pre-charge relay Rpr and the negative-electrode-side relay Rn causes a current flow through the pre-charge device R1, making it possible to pre-charge the power line Lb. After the pre-charging, the pre-charge relay Rpr may be turned off. The processing of pre-charging the power line Lb until the pre-charge relay Rpr is turned off is hereinafter referred to as "pre-charge processing".

Although the pre-charge relay Rpr and the pre-charge device R1 are provided on positive-electrode side of the pair of the power lines Lb in FIG. 1, they may be provided on negative-electrode side. In this case, turning on the pre-charge relay Rpr and the positive-electrode-side relay Rp makes it possible to perform the pre-charging of the power line Lb.

The vehicle 1 may further include a power supply unit 25. The power supply unit 25 may supply a power supply voltage to an electric device other than the traveling motor 13. The power supply unit 25 may include, for example, subunits such as an inverter for air conditioner 21 and an on-vehicle inverter 23. The inverter for air conditioner 21 may convert electric power transmitted from the power line Lb and output driving electric power to an air conditioner 22, that is, for example, to a compressor. The on-vehicle inverter 23 may convert electric power transmitted from the power line Lb into an AC power supply voltage, and output the AC power supply voltage to an inside-cabin power receptacle 24. An occupant of the vehicle 1 may allow the on-vehicle inverter 23 to operate, and thereby be able to couple, for example, a home electric appliance to the inside-cabin power receptacle 24 and use the home electric appliance.

Instead of the inside-cabin power receptacle 24, or in addition to the inside-cabin power receptacle 24, a vehicle exterior power receptacle may be coupled to the on-vehicle inverter 23. The vehicle exterior power receptacle makes it possible to use an electric appliance near the vehicle 1, or outside a cabin of the vehicle 1. In another alternative, instead of the on-vehicle inverter 23, the power supply unit 25 may include a connector and a relay to which an external inverter may be coupled. Coupling the external inverter to the connector and turning the relay on causes electric power supply from the power line Lb to the inverter in accordance with a control by the vehicle controller 15, causing an AC power supply voltage to be outputted from the external inverter to the vehicle exterior power receptacle. With such a configuration, it is possible for a user of the vehicle 1 to use a home electric appliance near the vehicle 1.

The vehicle 1 may further include a vehicle controller 15. The vehicle controller 15 may perform a travel control of the vehicle 1 and a control of each part of the vehicle 1. The vehicle controller 15 may include a single electronic control unit (ECU), or alternatively, the vehicle controller 15 may include a plurality of ECUs that operate in cooperation with one another. The ECU may include a central processing unit (CPU), a storage, and a random access memory (RAM). The storage may hold control programs to be executed by the CPU and control data. The RAM is provided for expansion of data by the CPU.

The vehicle controller 15 may drive the inverter 12 in accordance with, for example, an operation of a driving operation unit, to cause powering operation or regenerative operation of the traveling motor 13. This leads to the travel of the vehicle 1 in accordance with a driving operation. In addition, the vehicle controller 15 may perform a switching control of the system main relay Rs and the pre-charge relay Rpr, a start-up and stop control of the subunits of a power supply unit 25, and a control of inputs from the occupant through a mode setting unit 19 and a device operation unit 20. Non-limiting examples of the inputs from the occupant through the device operation unit 20 may include a request for a start-up of the subunits of the power supply unit 25. The mode setting unit 19 is able to set a control mode of the vehicle. Non-limiting examples of the control mode to be set by the mode setting unit 19 may include a deterioration suppression mode. The deterioration suppression mode includes suppressing deterioration in the battery 11. The mode setting unit 19 and the device operation unit 20 may be located at a position where the occupant in a vehicle cabin is able to operate them, e.g., on a dashboard. It is to be noted that the mode setting unit 19 or the device operation unit 20, or both, do not have to be located in the vehicle cabin.

Instead, adopted may be a configuration in which mode setting or a control of the subunits, or both, are available from a mobile device such as a so-called smartphone through telematics service.

The vehicle 1 may further include a charging connector 31, a communication unit 33, and a charging controller 34. The charging connector 31 is able to acquire charging electric power for the battery 11 from outside the vehicle 1. The communication unit 33 may perform communication with electric power transmission facilities outside the vehicle 1, through the charging connector 31. The charging controller 34 may perform a charging control of the battery 11. A charging relay Rj may be provided between the charging connector 31 and the power line Lb. The charging controller 34 may communicate with the BCU 14 and the vehicle controller 15 through a communication line Lc and perform the charging control of the battery 11 in cooperation with them. The charging controller 34 and the BCU 14 may include, for example, an ECU. The charging controller 34 is able to give the electric power transmission facilities a request for electric power transmission and a request for a stop of the electric power transmission, through the communication unit 33, with a charging plug 101 of the electric power transmission facilities coupled to the charging connector 31. The request for the electric power transmission may include, for example, a request to define magnitude of electric power and a request for a constant-voltage output. The charging controller 34 may perform switching of the charging relay Rj and give the electric power transmission facilities the request for the electric power transmission and the request for the stop, making it possible to switch between an output and a stop of a DC voltage from the charging plug 101, and to switch between an output and a stop of the DC voltage from the charging connector 31 to the power line Lb.

In one embodiment of the technology, the charging connector 31 may serve as an "electric power acquirer". In one embodiment of the technology, the vehicle controller 15 and the charging controller 34 may serve as a "controller".

It is to be noted that in the forgoing example of the charging connector 31, an example is given where the charging plug 101 that outputs the DC voltage may be coupled to the charging connector 31. Instead of the charging connector 31 as mentioned above, or in addition to the charging connector 31, provided may be an AC charging connector to which an AC voltage is inputted. In this case, a converter may be provided between the AC charging connector and the power line Lb. The converter may convert an AC power supply voltage into a DC voltage for the charging. The charging controller 34 may switch between a start-up and a stop of the converter, causing switching between an output and a stop of the DC voltage for the charging to the power line Lb.

<Charging Control Processing>

Assume that after the vehicle 1 stops and the system main relay Rs is brought to the disconnected state, the charging plug 101 is coupled to the charging connector 31, causing a transition to charging processing of the battery 11. In this case, first, the vehicle controller 15 may raise the voltage of the power line Lb by the pre-charge processing, and thereafter, bring the system main relay Rs to the connected state. Thereafter, the charging controller 34 may allow the charging plug 101 to output the DC voltage, and switch the charging relay Rj to the connected state. Thus, the output voltage of the charging plug 101 is transmitted to the battery 11 through the power line Lb, causing a start of the charging of the battery 11.

In the charging, the BCU 14 may measure, for example, the SOC of the battery 11, and send data thus measured to the charging controller 34. The charging controller 34 may determine an end of the charging, for example, in a case where the battery 11 becomes fully charged, or in a case where a predetermined amount of the charging is attained. Thereafter, the charging controller 34 may switch, by making a request of the vehicle controller 15, the system main relay Rs and the charging relay Rj to the disconnected state, and request the electric power transmission facilities to stop the output of the DC voltage. Thus, the output of the DC voltage from the charging plug 101 is stopped, causing the battery 11 to be separated from the power line Lb. Electric charges remaining in the power line Lb are discharged by a discharge unit, causing a prompt decrease in the voltage of the power line Lb. Thus, the charging processing of the battery 11 is terminated.

<Operation Processing of Power Supply Unit after End of Charging>

Figure 2:
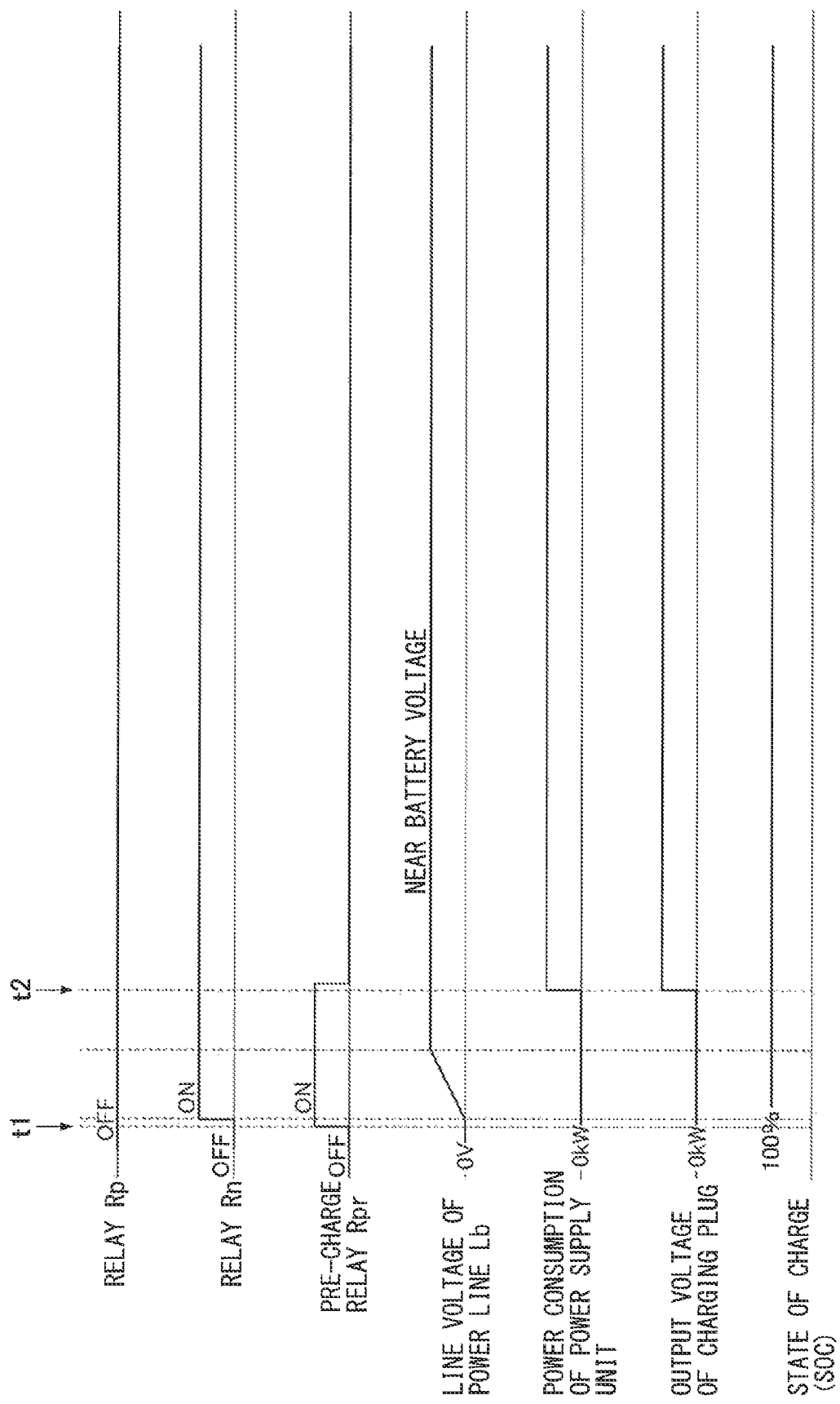
FIG. 2 is a time chart illustrating a state of each part, on a request for operation of a power supply unit after an end of charging, in the vehicle according to the first embodiment.

FIG. 2 is a time chart illustrating a state of each part, on a request for operation of the power supply unit 25 after the end of the charging, in the vehicle 1 according to the first embodiment.

After the end of the charging, as mentioned above, the voltage of the power line Lb is low, even if the charging plug 101 is not disconnected from the charging connector 31. In this state, an operation request for the operation of the power supply unit 25 is made (timing t1), and thereupon, the vehicle controller 15 may, first, perform the pre-charge processing, causing the rise in the voltage of the power line Lb. Thereafter, the vehicle controller 15 may cause, by making a request through the charging controller 34, the output of the voltage from the charging plug 101 to the power line Lb. In one specific but non-limiting example, the charging controller 34 may cause the DC voltage to be outputted from the charging plug 101, and switch the charging relay Rj to the connected state.

The vehicle controller 15 may keep the disconnected state of the system main relay Rs, at least from the pre-charge processing as mentioned above until the DC voltage is outputted from the charging plug 101 to the power line Lb.

Thereafter, the vehicle controller 15 cause an operation-requested subunit of the power supply unit 25 to operate (timing t2). In the following, description is given on an assumption that the operation-requested subunit is the on-vehicle inverter 23, but the following description also applies to other subunits of the power supply unit 25. In this way, electric power is directly transmitted from the charging plug 101 to the on-vehicle inverter 23, which in one embodiment of the technology may serve as a "direct transmission mode". The on-vehicle inverter 23 may generate an AC power supply voltage with the use of electric power thus transmitted, allowing the user of the vehicle 1 to drive an electric device coupled to the inside-cabin power receptacle 24. During the operation of the on-vehicle inverter 23, the vehicle controller 15 may keep the disconnected state of the system main relay Rs. Accordingly, during the use of the on-vehicle inverter 23, no electric power of the battery 11 is consumed, with the SOC kept substantially constant.

Figure 3:
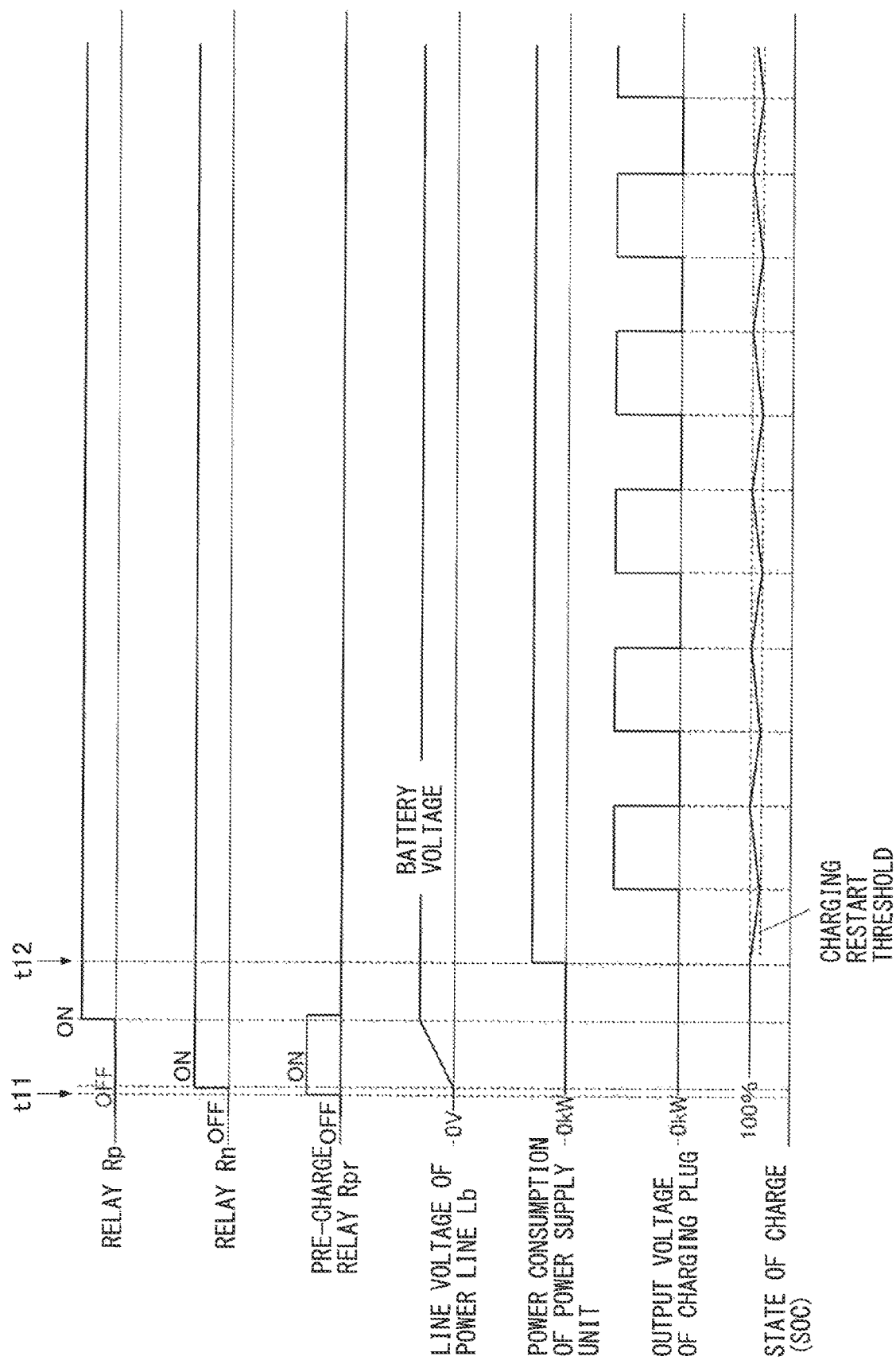
FIG. 3 is a time chart illustrating the state of each part, on the request for the operation of the power supply unit after the end of the charging, in a vehicle according to a comparative example.

FIG. 3 is a time chart illustrating the state of each part, on the request for the operation of the power supply unit 25 after the end of the charging, in a vehicle according to a comparative example. In a configuration of the vehicle according to the comparative example, the output from the charging plug 101 is stopped when the battery 11 becomes fully charged, and the output from the charging plug 101 is restarted when the SOC of the battery 11 becomes lower than a charging restart threshold.

In such a configuration, after the end of the charging of the battery 11, on the operation request for the operation of the power supply unit 25 at timing t11, the pre-charge processing is performed, and thereafter, the system main relay Rs is brought to the connected state, with the relays Rp and Rb both turned on, making it possible to transmit electric power from the battery 11 to the power supply unit 25. Thereafter, at timing t12, the power supply unit 25 starts up, and thereupon, the power supply unit 25 consumes electric power of the battery 11. At this occasion, with no output of the charging plug 101, the SOC of the battery 11 lowers. Thus, the SOC of the battery 11 becomes lower than the charging restart threshold, and thereupon, the output of the DC voltage from the charging plug 101 is restarted, and the battery 11 is recharged. In the recharging of the battery 11, part of electric power outputted from the charging plug 101 is transmitted to the power supply unit 25. This causes the power supply voltage of the electric device to be outputted from the power supply unit 25.

In such a charging control, the operation of the power supply unit 25 after the charging causes repetition of the discharging and the charging of the battery 11, contributing early deterioration in the battery 11. As is understood from comparison of FIGS. 2 and 3, in the control according to this embodiment, it is possible to restrain the repetition of the discharging and the charging of the battery 11 as described above.

As described, according to the vehicle 1 of the first embodiment, on the operation request for the operation of the power supply unit 25, with the system main relay Rs being in the disconnected state, and with the output of electric power being available from the charging plug 101 coupled to the charging connector 31, the vehicle controller 15 first performs the pre-charge processing. Furthermore, the vehicle controller 15 may cause the electric power transmission from the charging plug 101 to the power supply unit 25, with the system main relay Rs kept in the disconnected state. With such a control, the situation such as the repetition of the discharging and the charging of the battery 11 is avoided even if the charging plug 101 provides the electric power supply, and the power supply unit 25 is in operation. Hence, it is possible to suppress the early deterioration of the battery 11.

Second Embodiment

The vehicle 1 according to a second embodiment is similar to that of the first embodiment except for contents of the control of the electric power transmission. Similar constituent elements are denoted by the same reference characters, and description thereof is omitted.

Figure 4:
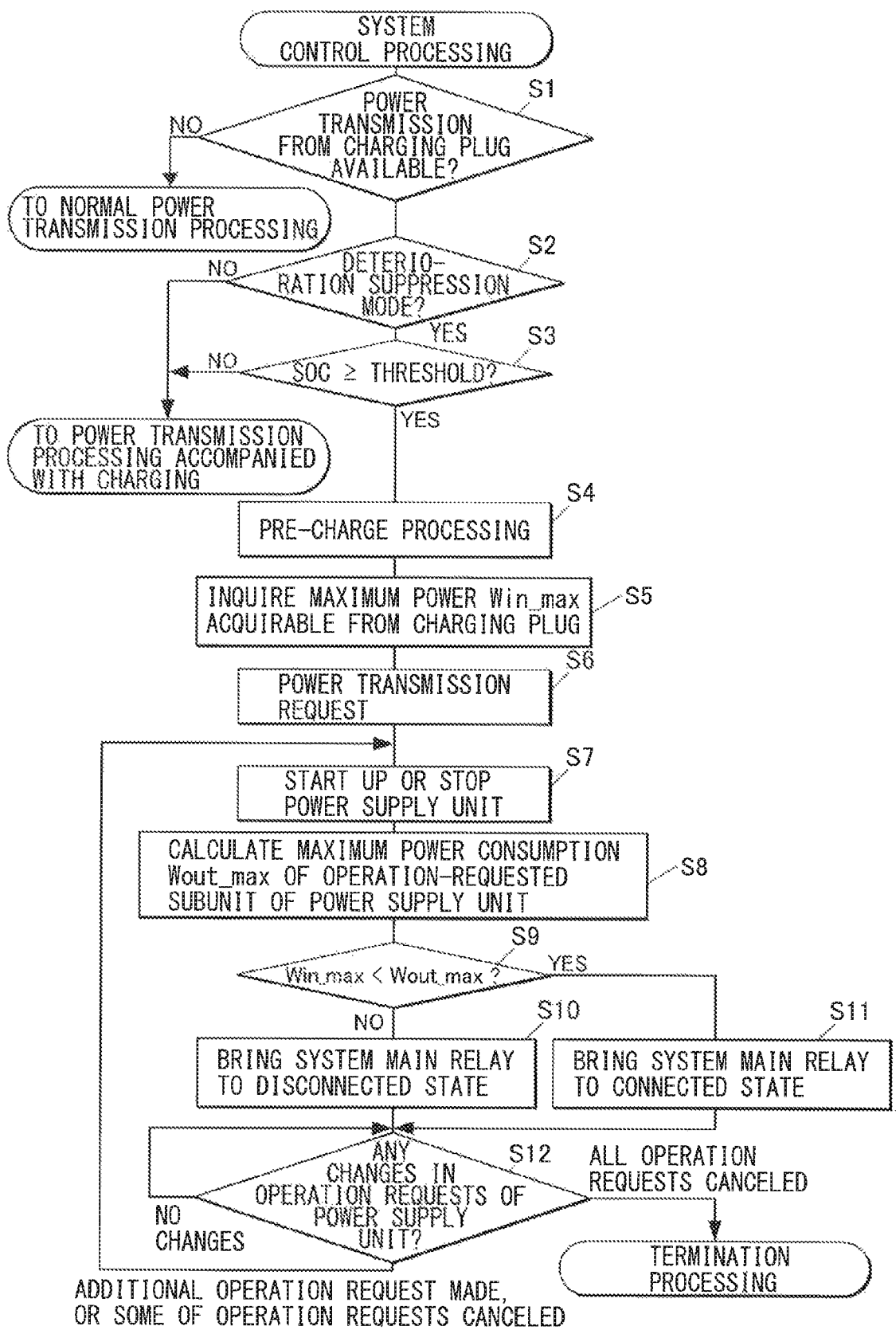
FIG. 4 is a flowchart illustrating a procedure of system control processing to be executed by a vehicle controller of a vehicle according to a second embodiment.

FIG. 4 is a flowchart illustrating a procedure of a system control processing to be executed by the vehicle controller 15 according to the second embodiment.

After the end of the charging of the battery 11, on a request for the operation of the power supply unit 25 without movement of the vehicle 1, the vehicle controller 15 may start the system control processing in FIG. 4. First, the vehicle controller 15 may make an inquiry of the charging controller 34, to determine whether or not the electric power transmission from the charging plug 101 is available (step S1). As a result, in a case where the electric power transmission from the charging plug 101 is unavailable (step S1: NO), the vehicle controller 15 may shift to the normal power transmission processing. In the normal power transmission processing, the vehicle controller 15 may perform the pre-charge processing, and switch the system main relay Rs to the connected state, to cause the electric power transmission from the battery 11 to the power supply unit 25.

Meanwhile, in a case where the electric power transmission from the charging plug 101 is available (step S1: YES), the vehicle controller 15 may determine whether or not the control mode of the vehicle 1 is the deterioration suppression mode of the battery 11 (step S2). In addition, the vehicle controller 15 may determine whether or not the SOC of the battery 11 is equal to or higher than a predetermined threshold that represents a small value (step S3). The predetermined threshold may be set equal to or higher than the charging restart threshold. In a case where the control mode of the vehicle 1 is not the deterioration suppression mode of the battery 11, or the SOC of the battery 11 is lower than the predetermined threshold, or both (step S2 or S3, or both: NO), the vehicle controller 15 may shift to the power transmission processing accompanied with the charging. The power transmission processing accompanied with the charging corresponds to the processing illustrated in FIG. 3. In this processing, the vehicle controller 15 may transmit electric power from the battery 11 to the power supply unit 25, in the case where the SOC of the battery 11 is high. Meanwhile, in a case where the SOC of the battery 11 becomes lower than the charging restart threshold, the vehicle controller 15 may allow the charging plug 101 to start the electric power transmission, to perform the charging of the battery 11 and the electric power transmission to the power supply unit 25. In the case where the SOC of the battery 11 is lower than the predetermined threshold (step S3: NO), with the SOC of the battery 11 being low from the beginning, the vehicle controller 15 may cause the electric power transmission from the charging plug 101, from the start-up of the power supply unit 25 (timing t12). When the battery 11 becomes fully charged, the vehicle controller 15 may shift to the control operation at and after timing t12 in FIG. 3.

As a result of the determination of step S2, in a case where the control mode of the vehicle 1 is the deterioration suppression mode and the SOC of the battery 11 is equal to or higher than the threshold (steps S2 and S3: YES), the vehicle controller 15 may shift to direct transmission processing (steps S4 to S12). The direct transmission processing may include causing the electric power transmission from the charging plug 101 to the power supply unit 25. In the direct transmission processing, the vehicle controller 15 may, first, perform the pre-charge processing (step S4), and inquire of the electric power transmission facilities through the charging controller 34 and the communication unit 33, maximum input power Win_max from the charging plug 101 (step S5). In addition, the vehicle controller 15 may give the electric power transmission facilities the request for the electric power transmission, causing the output of the DC voltage from the charging plug 101 (step S6). Thus, the vehicle controller 15 may start up the operation-requested subunit of the power supply unit 25 (step S7). The processing of steps S4, S6, and S7 corresponds to the control processing from timing t1 to timing t2 in FIG. 2.

In one embodiment of the technology, the direct transmission processing may serve as a "direct transmission mode".

Thereafter, the vehicle controller 15 may calculate maximum power consumption Wout_max of the operation-requested subunit of the power supply unit 25 (step S8). As to the subunit whose power consumption varies with the electric device to be coupled to the relevant subunit, e.g., as to the on-vehicle inverter 23, it suffices for the vehicle controller 15 to calculate rated capacity of the subunit as the maximum power consumption. Thereafter, the vehicle controller 15 may compare the maximum power consumption Wout_max and the maximum input power Win_max acquirable from the charging plug 101 (step S9). It is to be noted that in the comparison processing of step S9, the vehicle controller 15 may make the comparison, with one of them multiplied by a coefficient for a margin. Moreover, targets of the comparison of step S9 may be a value that represents electric power involved in the operation of the power supply unit 25 and a value that represents electric power acquirable from the charging connector 31. For example, the maximum power consumption may be replaced with average power consumption. In a case where electric power to be involved in the operation of the power supply unit 25 or electric power acquirable from the charging connector 31 is fixed, the comparison may be made, with the relevant one of them assumed to be a fixed value.

As a result of the comparison processing of step S9, in a case where the maximum input power Win_max acquirable from the charging plug 101 is greater (step S9: NO), the vehicle controller 15 may bring the system main relay Rs to the disconnected state (step S10). In a case where the maximum power consumption Wout_max is greater (step S9: YES), the vehicle controller 15 may bring the system main relay Rs to the connected state (step S11). With the switching of steps S10 and S11, in a case where electric power from the charging plug 101 is sufficient for the operation of the power supply unit 25, as illustrated in FIG. 2, the system main relay Rs may be brought to the disconnected state, causing the electric power transmission to the power supply unit 25 without using electric power of the battery 11. In a case where electric power from the charging plug 101 is just insufficient for the operation of the power supply unit 25, the system main relay Rs may be brought to the connected state, causing shortage of electric power to be compensated from the battery 11. This makes it possible to normally supply a power supply voltage from the power supply unit 25 to the electric device.

During the electric power transmission to the power supply unit 25, the vehicle controller 15 may determine presence or absence of any changes in the operation requests of the power supply unit 25 (step S12). In a case with no changes, the vehicle controller 15 may repeat step S12. In a case where an additional operation request is made, or some of the operation requests are canceled, the vehicle controller 15 may return to step S7 and perform the control of starting up the additionally-operation-requested subunit of the power supply unit 25 or stopping the operation-request-canceled subunit of the power supply unit 25. Thereafter, the vehicle controller 15 may repeat the processing of, and subsequent to, step S8. Meanwhile, as a result of the determination of step S12, in a case where all the operation requests are canceled, the vehicle controller 15 may shift to termination processing of the electric power transmission processing from the charging plug 101 to the power supply unit 25.

As described, according to the vehicle 1 of the second embodiment, after the end of the charging, pre-charge processing is performed, and thereafter, the electric power transmission is performed from the charging plug 101 to the power supply unit 25. During the electric power transmission, in the case where the maximum power consumption of the power supply unit 25 is greater, the vehicle controller 15 may switch the system main relay Rs to the connected state. Similarly, in the case where the maximum input power from the charging plug 101 is smaller, the vehicle controller 15 may switch the system main relay Rs to the connected state. This makes it possible to compensate the shortage of electric power to be transmitted to the power supply unit 25 with electric power of the battery 11. Hence, it is possible to attain the normal operation of the power supply unit 25.

Moreover, according to the vehicle 1 of the second embodiment, the switching may be made, on the basis of the SOC of the battery 11, as to whether to cause the transition to the power transmission processing accompanied with the charging, or whether to cause the transition to the direct transmission processing of steps S4 to S12 in FIG. 4. Hence, it is possible to avoid the situation that when the user uses the power supply unit 25 with the charging plug 101 kept connected, the charging does not progress with the SOC of the battery remaining low, giving the user the sense of incongruity.

Furthermore, according to the vehicle 1 of the second embodiment, in the case where the deterioration suppression mode of the battery 11 is selected, the vehicle controller 15 is able to shift to the direct transmission processing of steps S4 to S12 in FIG. 4. Hence, it is possible for the user to select whether to give priority to the charging of the battery 11 or whether to give priority to the suppression of the deterioration in the battery 11, by the setting of the control mode of the vehicle 1.

Although some preferred but non-limiting embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.

For example, a "power supply unit" of the technology is not limited to the configuration in FIG. 1, but may include, for example, a DC/DC converter or a relay. The DC/DC converter may output a DC voltage as a power supply voltage of a device coupled to the power supply unit. The relay may output the voltage of the battery as it is as the power supply voltage of the device coupled to the power supply unit.

Moreover, in the second embodiment, described is the configuration in which the switching may be made as to whether or not to shift to the direct transmission processing, in accordance with a plurality of conditions such as the control mode of the vehicle and the SOC of the battery. However, one or more of such conditions may be omitted.

Furthermore, in the forgoing embodiments, a "controller" of the technology is exemplified by the vehicle controller and the charging controller that cooperate with each other to perform the switching of the mode of the electric power transmission. However, the vehicle controller or the charging controller may perform the switching control of the mode of the electric power transmission, or alternatively, a dedicated controller may perform the switching control of the mode of the electric power transmission.

Moreover, the forgoing embodiments exemplify a configuration with an "electric power acquirer" of the technology configured to acquire electric power by wire. However, the "electric power acquirer" of the technology may be configured to acquire electric power wirelessly. In addition, the details described in the forgoing embodiments may be appropriately changed insofar as the changes fall within a range not departing from the scope of the technology.

According to the aspect of the technology, in a case where a relay is switched to a disconnected state and electric power acquisition from an electric power acquirer is available, e.g., at an end of charging of a battery, on a request for operation of a power supply unit, a controller performs pre-charge processing. Thereupon, an output voltage of the battery causes a rise in a voltage of a power line, making it possible to acquire electric power from the electric power acquirer to the power line. Thus, the controller causes a transition of a mode of electric power transmission to a direct transmission mode. This causes electric power acquired from the electric power acquirer to be supplied to the power supply unit, making it possible to supply a power supply voltage from the power supply unit to a device. In the direct transmission mode, electric power acquired from the electric power acquirer is transmitted to the power supply unit, without repetition of discharging and charging of the battery. Hence, it is possible to suppress early deterioration in the battery.

The vehicle controller 15 and the charging controller 34 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle controller 15 and the charging controller 34. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the vehicle controller 15 and the charging controller 34 illustrated in FIG. 1.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A vehicle, comprising:
   a battery configured to accumulate electric power for travel of the vehicle;
   an electric power acquirer configured to acquire charging electric power for the battery, from outside the vehicle;
   a power line including a first power line electrically connected to a positive electrode of the battery and a second power line electrically connected to a negative electrode of the battery, the power line being electrically connected to at least one of an electric device of the vehicle other than a travelling motor of the vehicle or a power receptacle of the vehicle, the power line being further electrically connected to the electric power acquirer,
   a main relay configured to switch electrically connecting between the battery and the power line, the main relay including a first relay through which the first power line is electrically connected to the positive electrode and a second relay through which the second power line is electrically connected to the second electrode;
   a pre-charge relay and a pre-charge device, the pre-charge relay and the pre-charge device being coupled in parallel to one of the first relay and the second relay so that the pre-charge relay being allowed to couple the battery and the power line through the pre-charge device;
   a power supply unit configured to receive electric power from the power line and supply a power supply voltage to the electric device; and
   a controller configured to perform a control of electric power transmission through the power line,
   the controller being configured to
      execute pre-charge processing on a request for operation of the power supply unit, with the main relay being in a state where the one of the first relay and the second relay is turned off and another of the first relay and the second relay is turned on, and with the electric power acquirer being available for electric power acquisition, the pre-charge processing including turning on the pre-charge relay to raise a voltage between the first power line and the second power line, and
      cause, sequentially following the executing the pre-charge processing, a transition of a mode of the electric power transmission to a first direct transmission mode, the first direct transmission mode including transmitting electric power acquired by the electric power acquirer to the power supply unit in a state where the pre-charge relay is turned off, and the first relay, the second relay or both of the first relay and the second relay are turned off.

2. The vehicle according to claim 1, wherein
   the controller, on a basis of electric power acquirable from the electric power acquirer or electric power to be involved in the operation of the power supply unit, or both, is configured to prohibit the transition of the mode of the electric power transmission to the first direct transmission mode, and cause, in response to the executing the pre-charge processing, a transition of the mode of the electric power transmission to a second direct transmission mode, and
   the second direct transmission mode includes transmitting electric power acquired by the electric power acquirer to the power supply unit in a state where the first relay and the second relay are turned on.

3. The vehicle according to claim 1, wherein the controller switches whether or not to cause the transition to the first direct transmission mode, on a basis of a state of charge of the battery.

4. The vehicle according to claim 2, wherein the controller switches whether or not to cause the transition to the second direct transmission mode, on a basis of a state of charge of the battery.

5. The vehicle according to claim 1, further comprising a mode setting unit able to set a control mode of the vehicle, wherein
   the controller switches whether or not to cause the transition to the first direct transmission mode, on a basis of the control mode.

6. The vehicle according to claim 2, further comprising a mode setting unit able to set a control mode of the vehicle, wherein
   the controller switches whether or not to cause the transition to the second direct transmission mode, on a basis of the control mode.

7. The vehicle according to claim 3, further comprising a mode setting unit able to set a control mode of the vehicle, wherein the controller switches whether or not to cause the transition to the first direct transmission mode, on a basis of the control mode.

8. The vehicle according to claim 4, further comprising a mode setting unit able to set a control mode of the vehicle, wherein
the controller switches whether or not to cause the transition to the second direct transmission mode, on a basis of the control mode.

9. The vehicle according to claim 1, wherein the pre-charge device includes a resistor to perform pre-charging of the power line or an input capacitance of a device coupled to the power line,
wherein the pre-charge processing includes controlling the raising of the voltage at a reduced level compared to the first direct transmission mode by switching the pre-charge relay.

10. The vehicle according to claim 1, wherein the pre-charge relay under the pre-charge processing is disconnected after a power consumption of the power supply unit changes from 0 kw to a value more than 0 kw.

11. The vehicle according to claim 1, wherein the controller is configured to execute the pre-charge processing by either turning on the pre-charge relay and the first relay to raise the voltage between the first power line and the second power line when the pre-charge relay and the pre-charge device are coupled in parallel to the first relay, or
turning on the pre-charge relay and the second relay to raise the voltage between the first power line and the second power line when the pre-charge relay and the pre-charge device are coupled in parallel to the second relay.

\* \* \* \* \*